(12) United States Patent
Kim

(10) Patent No.: US 12,187,247 B2
(45) Date of Patent: Jan. 7, 2025

(54) ELECTRONIC BRAKE SYSTEM

(71) Applicant: HL MANDO CORPORATION, Gyeonggi-do (KR)

(72) Inventor: Jin Seok Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 694 days.

(21) Appl. No.: 17/438,360

(22) PCT Filed: Mar. 11, 2020

(86) PCT No.: PCT/KR2020/003363
§ 371 (c)(1),
(2) Date: Sep. 10, 2021

(87) PCT Pub. No.: WO2020/184968
PCT Pub. Date: Sep. 17, 2020

(65) Prior Publication Data
US 2022/0176930 A1    Jun. 9, 2022

(30) Foreign Application Priority Data
Mar. 11, 2019    (KR) .................. 10-2019-0027279

(51) Int. Cl.
*B60T 13/62* (2006.01)
*B60T 8/32* (2006.01)
(Continued)

(52) U.S. Cl.
CPC .............. *B60T 13/62* (2013.01); *B60T 8/326* (2013.01); *B60T 13/142* (2013.01);
(Continued)

(58) Field of Classification Search
CPC ........ B60T 13/62; B60T 8/326; B60T 13/142; B60T 13/148; B60T 13/686;
(Continued)

(56) References Cited

U.S. PATENT DOCUMENTS 5,729,979 A    3/1998 Shaw et al.
6,318,817 B1 *    11/2001 Martin .................. B60T 13/686
303/116.1
(Continued)

FOREIGN PATENT DOCUMENTS

JP    2002-337678    11/2002
KR    10-2011-0036109    4/2011
(Continued)

OTHER PUBLICATIONS

Office Action dated Jul. 19, 2023 for Korean Patent Application No. 10-2019-0027279 and its English translation from Global Dossier.
(Continued)

*Primary Examiner* — Bradley T King
*Assistant Examiner* — James K Hsiao
(74) *Attorney, Agent, or Firm* — WOMBLE BOND DICKINSON (US) LLP

(57) ABSTRACT

Disclosed herein an electronic brake system includes a first block in which a mechanical unit operated mechanically in association with a brake pedal is disposed; a second block in which an electrical unit electronically operated and controlled by an electronic control unit is disposed; and a connection line configured to hydraulically connect the first block and the second block, and the first block and the second block are installed at positions spaced apart in a vehicle so that mountability of the brake system and the degree of freedom in design of the vehicle may be improved.

14 Claims, 3 Drawing Sheets

(51) Int. Cl.
  *B60T 8/40* (2006.01)
  *B60T 13/14* (2006.01)
  *B60T 13/68* (2006.01)
  *B60T 17/04* (2006.01)
(52) U.S. Cl.
  CPC .......... *B60T 13/148* (2013.01); *B60T 13/686* (2013.01); *B60T 8/4081* (2013.01); *B60T 17/04* (2013.01); *B60T 2270/402* (2013.01); *B60T 2270/404* (2013.01); *B60T 2270/82* (2013.01)
(58) Field of Classification Search
  CPC .. B60T 8/4081; B60T 17/04; B60T 2270/402; B60T 2270/404; B60T 2270/82
  See application file for complete search history.

(56) References Cited

U.S. PATENT DOCUMENTS

| | | | | |
|---|---|---|---|---|
| 8,261,546 | B1* | 9/2012 | Paige | B60T 11/232 60/562 |
| 9,108,604 | B2* | 8/2015 | Bohm | B60T 8/4081 |
| 9,145,119 | B2* | 9/2015 | Biller | B60T 8/17 |
| 9,428,242 | B2* | 8/2016 | Ginther | B62K 25/04 |
| 10,358,119 | B2* | 7/2019 | Besier | B60T 13/142 |
| 10,926,748 | B2* | 2/2021 | Besier | B60T 8/4086 |
| 2004/0090115 | A1* | 5/2004 | Inoue | B60T 8/368 303/DIG. 10 |
| 2010/0206673 | A1* | 8/2010 | Hitzel | B60T 8/267 188/106 R |
| 2010/0282549 | A1* | 11/2010 | Feigel | B60T 8/4072 188/110 |
| 2011/0115282 | A1* | 5/2011 | Dinkel | B60T 13/143 303/3 |
| 2014/0203626 | A1* | 7/2014 | Biller | B60T 7/02 303/14 |
| 2015/0061364 | A1* | 3/2015 | Murayama | B60T 8/4081 303/15 |
| 2016/0023644 | A1* | 1/2016 | Feigel | B60T 8/4081 303/3 |
| 2017/0274884 | A1* | 9/2017 | Besier | B60T 13/686 |
| 2017/0282877 | A1* | 10/2017 | Besier | B60T 8/885 |
| 2017/0361825 | A1* | 12/2017 | Drumm | B60T 8/4081 |
| 2018/0162332 | A1* | 6/2018 | Nakazawa | B60T 7/22 |
| 2019/0344767 | A1* | 11/2019 | Bareiss | B60T 7/12 |
| 2019/0344769 | A1* | 11/2019 | Zimmermann | B60T 8/326 |
| 2021/0070267 | A1* | 3/2021 | Weh | B60T 8/4081 |

FOREIGN PATENT DOCUMENTS

| | | |
|---|---|---|
| KR | 10-2015-0138295 | 12/2015 |
| KR | 10-2016-0028043 | 3/2016 |
| KR | 10-2018-0109179 | 10/2018 |

OTHER PUBLICATIONS

International Search Report for PCT/KR2020/003363 mailed on Jul. 8, 2020 (now published as WO 2020/184968) with English translation provided by the WIPO.

Written Opinion of the International Searching Authority for PCT/KR2020/003363 mailed on Jul. 8, 2020 (now published as WO 2020/184968) with English translation provided by Google Translate.

* cited by examiner

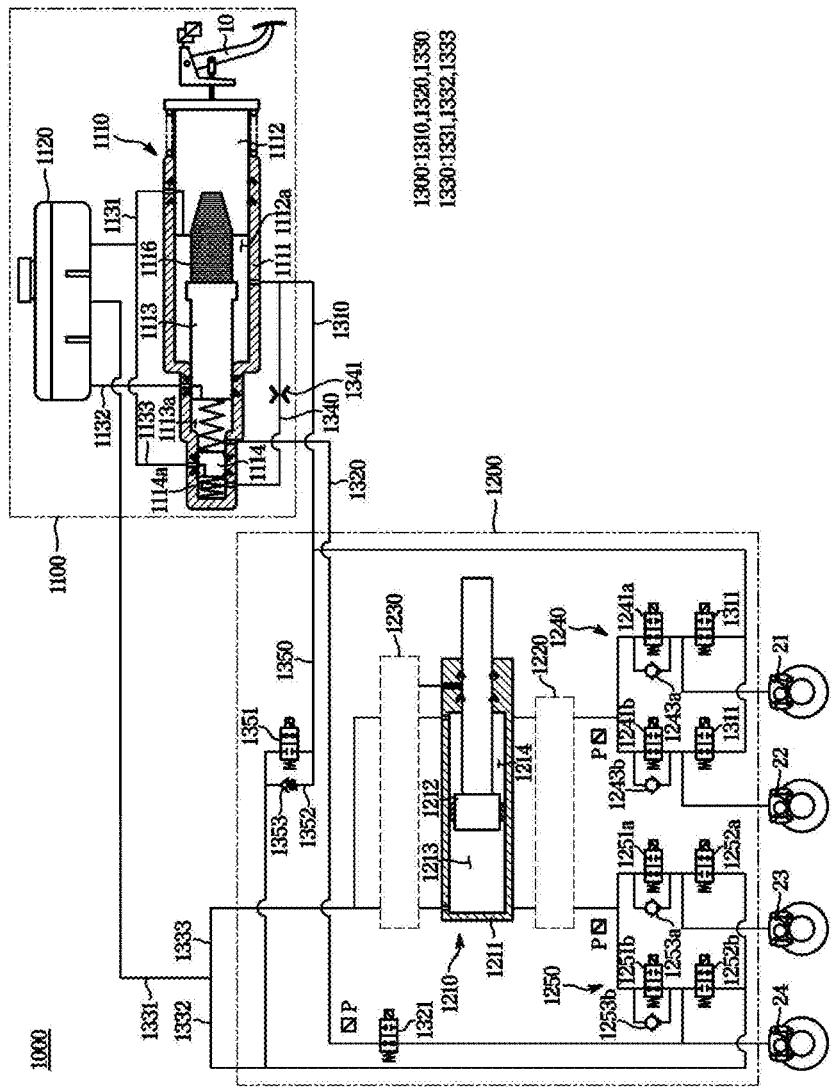
[FIG. 1]

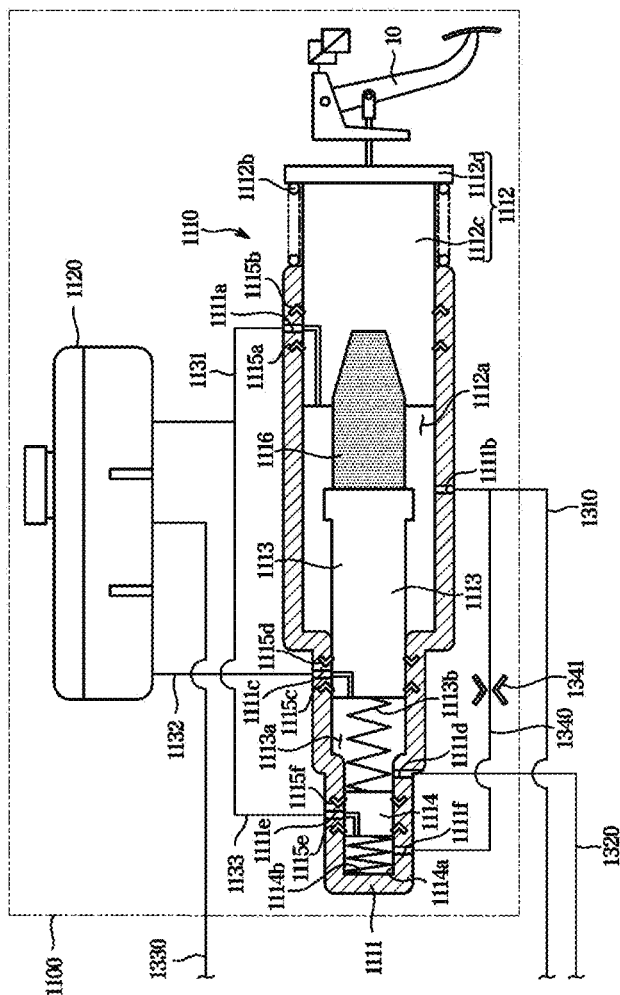
[FIG. 2]

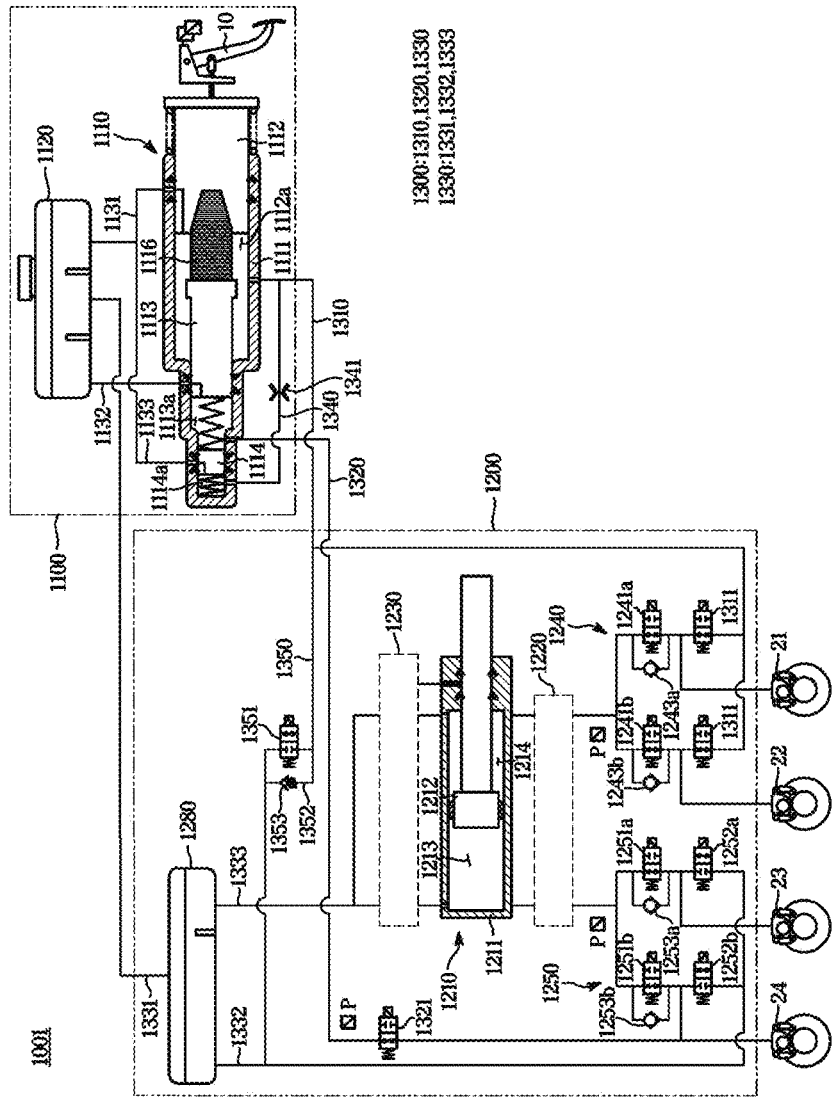
[FIG. 3]

ELECTRONIC BRAKE SYSTEM

CROSS-REFERENCE TO RELATED APPLICATIONS

This application is the national stage of International Application No. PCT/KR2020/003363, filed on Mar. 11, 2020, which claims priority, under 35 U.S.C. 119 (a), to Korean Patent Application No. 10-2019-0027279 filed in the Korean Intellectual Property Office on Mar. 11, 2019, the disclosure of which is incorporated by reference herein in their entireties.

TECHNICAL FIELD

The disclosure relates to an electronic brake system, and more particularly, to an electronic brake system that generates braking force using an electrical signal corresponding to a displacement of a brake pedal.

BACKGROUND ART

Vehicles are essentially equipped with a brake system for performing braking, and various types of brake systems have been proposed for the safety of drivers and passengers.

In a conventional brake system, a method of supplying a hydraulic pressure required for braking to wheel cylinders using a mechanically connected a booster when a driver depresses a brake pedal has been mainly used. However, as market demands to implement various braking functions in a detailed response to operation environments of vehicles increase, in recent years, an electronic brake system and an operation method thereof, which include a hydraulic pressure supply device that receives an electrical signal corresponding to a pressing force of a driver from a pedal displacement sensor that detects a displacement of a brake pedal when the driver depresses the brake pedal and supplies a hydraulic pressure required for braking to wheel cylinders, have been widely used.

In such an electronic brake system and an operation method thereof, an electrical signal is generated and provided when a driver depresses the brake pedal or the vehicle travels an autonomous driving, in a normal operation mode, and based on this, the hydraulic pressure supply device is electrically operated and controlled to generate a hydraulic pressure required for braking and transmit the hydraulic pressure to the wheel cylinders. Although such an electronic brake system and operation method are electrically operated and controlled so that complex and various braking operations may be implemented, when a technical problem occurs in an electrical component, a hydraulic pressure required for braking may not be stably generated, and thus the safety of passengers may not be secured.

Accordingly, an electronic brake system enters an abnormal operation mode when any one of components is failed or falls out of control, and in this case, a mechanism in which a driver's brake pedal operation is directly interworked with the wheel cylinders is required. In other words, in the abnormal operation mode of the electronic brake system, hydraulic pressure required for braking is directly formed as the driver applies a pedal effort to the brake pedal, and the hydraulic pressure must be directly transmitted to the wheel cylinders.

On the other hand, when an electronic brake system is mounted on a vehicle, a degree freedom of the vehicle is limited due to the limitations of a size and an installation position of a system module. Accordingly, a method for efficiently installing a system module while maintaining braking performance of a vehicle has been required.

DISCLOSURE

Technical Problem

The disclosure provides an electronic brake system capable of reducing the number of parts and reducing a size and a weight of the product.

Further, the disclosure provides an electronic brake system capable of improving a degree of design freedom of a vehicle.

Further, the disclosure provides an electronic brake system capable of performing easily and efficiently installing and disposing in the vehicle.

Further, the disclosure provides an electronic brake system capable of improving assembling and productivity of the product and reducing the manufacturing cost of the product.

Further, the disclosure provides an electronic brake system capable of improving performance and operational reliability.

Further, the disclosure provides an electronic brake system capable of effectively implementing braking in various operating situations.

Technical Solution

In accordance with an aspect of the disclosure, an electronic brake system includes a first block in which a mechanical unit operated mechanically in association with a brake pedal is disposed; a second block in which an electrical unit electronically operated and controlled by an electronic control unit (ECU) is disposed; and a connection line configured to hydraulically connect the first block and the second block; wherein the mechanical unit comprises: a main reservoir in which a pressurized medium is stored; and an integrated master cylinder comprising a simulation piston connected to the brake pedal, a simulation chamber whose volume is changed by a displacement of the simulation piston, a master piston connected to the simulation piston, a master chamber whose volume is changed by a displacement of the master piston, and an elastic member provided between the simulation piston and the master piston; the electrical unit comprises: a hydraulic pressure supply device configured to generate a hydraulic pressure by operating a hydraulic piston by an electric signal output in response to a displacement of the brake pedal; a hydraulic control unit including a first hydraulic circuit having two wheel cylinders, a second hydraulic circuit having the other two wheel cylinders, and a plurality of flow paths and valves configured to control a hydraulic pressure transmitted to the first hydraulic circuit and the second hydraulic circuit; and the ECU; the connection line comprises: a first connection line connecting the simulation chamber to the first hydraulic circuit; a second connection line connecting the master chamber to the second hydraulic circuit; and a third connection line connecting the main reservoir to the hydraulic pressure supply device and the second hydraulic circuit, respectively.

The master piston may include a first master piston and a second master piston, the master chamber may include a first master chamber whose volume is changed by a displacement of the first master piston and a second master chamber whose volume is changed by a displacement of the second master piston, the first master piston may be connected to the simulation piston through the elastic member, and the second master piston may be provided between the first master chamber and the second master chamber to be displaceable by a hydraulic pressure of the first master chamber.

The third connection line may include a main line communicating with the main reservoir, a first sub-line branched from the main line and connected to the second hydraulic circuit, and a second sub-line branched from the main line and connected to the hydraulic pressure supply device.

The electrical unit may further include a sub-reservoir provided at a point where the first and second sub-lines are branch from the main line to auxiliary store the pressurized medium.

The electrical unit may further include a simulation flow path branched from the first connection line and connected to the first sub-line, and a simulator valve provided in the simulation flow path.

The electrical unit may further include at least one first cut valve provided in the first connection line to control a flow of the pressurized medium, and a second cut valve provided in the second connection line to control a flow of the pressurized medium.

The first hydraulic circuit may include first and second inlet valves configured to control a flow of the pressurized medium supplied from the hydraulic pressure supply device to first and second wheel cylinders, respectively, and the pressurized medium discharged from the first and second wheel cylinders is supplied to the first connection line and is controlled by the first cut valve, and the second hydraulic circuit may include third and fourth inlet valves configured to control a flow of the pressurized medium supplied from the hydraulic pressure supply device to third and fourth wheel cylinders, respectively, and first and second outlet valves configured to control the pressurized medium that is discharged from the third and fourth wheel cylinders and supplied to the first sub-line.

The mechanical unit may further include a reservoir flow path connecting the main reservoir and the integrated master cylinder, and the reservoir flow path may include a first reservoir flow path connecting the reservoir and the simulation chamber, a second reservoir flow path connecting the reservoir and the first master chamber, and a third reservoir flow path connecting the reservoir and the second master chamber.

The first connection line and the second connection line may be provided with a pipe having rigidity, and the third connection line may be provided with a hose having elasticity.

The second connection line may connect the first master chamber to the second hydraulic circuit side, and the mechanical unit may further include a circulation line connecting the second master chamber and the first connection line, and an orifice provided in the circulation line.

The electrical unit may further include a dump control unit provided between the hydraulic pressure supply device and the second sub-line to control a flow of the pressurized medium.

The electrical unit may further include a bypass flow path connected in parallel to the simulator valve on the simulation flow path, and a simulator check valve provided in the bypass flow path to allow only a flow of the pressurized medium from the first sub-line toward the first connection line.

The integrated master cylinder may further include a simulator spring elastically supporting the simulation piston, a first piston spring interposed between the first master piston and the second master piston, and a second piston spring interposed between a cylinder block and the second master piston.

The hydraulic supply device may include a first pressure chamber positioned in a front side of the hydraulic piston, and a second pressure chamber positioned in a rear side of the hydraulic piston.

The second sub-line may be provided to be branched toward the first pressure chamber and the second pressure chamber.

Advantageous Effects

The electronic brake system according to an embodiment of the disclosure may reduce the number of parts and reducing a size and a weight of the product.

Further, the electronic brake system according to the embodiment of the disclosure may improve the degree of design freedom of the vehicle.

Further, the electronic brake system according to the embodiment of the disclosure may perform easily and efficiently installing and disposing in the vehicle.

Further the electronic brake system according to the embodiment of the disclosure may improve assembling and productivity of the product and reduce the manufacturing cost of the product.

Further, the electronic brake system according to the embodiment of the disclosure may improve performance and operational reliability.

Further, the electronic brake system according to the embodiment of the disclosure may effectively implement braking in various operating situations.

DESCRIPTION OF DRAWINGS

FIG. 1 is a hydraulic circuit diagram illustrating an electronic brake system according to an embodiment of a disclosure, FIG. 2 is an enlarged cross-sectional view of a first block of the electronic brake system according to the embodiment of the disclosure.

FIG. 3 is a hydraulic circuit diagram showing a modified example of the electronic brake system according to the embodiment of the disclosure.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a hydraulic circuit diagram showing an electronic brake system 1000 according to an embodiment of the disclosure.

Referring to FIG. 1, the electronic brake system 1000 according to an embodiment may include a first block 1100 in which a mechanically operated mechanical unit is disposed, a second block 1200 in which an electronically operated and controlled electrical unit is disposed, and a connection line 1300 hydraulically connecting the first block 1100 and the second block 1200.

The first block 1100 includes the mechanical unit connected and interworked with a brake pedal 10 to provide a mechanical operation, and the second block 1200 includes the electrical unit electronically operated and controlled, such as various solenoid valves whose operation is controlled by an electronic control unit (ECU). The first block 1100 and the second block 1200 are spaced apart from each other in a vehicle and may be hydraulically connected by a plurality of connection lines 1300, thereby improving a vehicle installation of the electronic brake system 1000, and further, by promoting a degree of freedom in design of the vehicle, efficient space arrangement may be possible.

The mechanical unit includes components that perform a mechanical operation in conjunction with the brake pedal 10 irrespective of a control signal of the ECU.

The mechanical unit may include a main reservoir 1120 in which a pressurized medium such as a brake oil is stored, an integrated master cylinder 1110 that provides a reaction force according to a pedaling force of the brake pedal 10 to a driver and pressurizes and discharges the pressurized medium accommodated therein, and reservoir flow paths 1131, 1132, and 1133 connecting the main reservoir 1120 and the integrated master cylinder 1110.

The integrated master cylinder 1110 includes a simulation chamber 1112a and master chambers 1113a and 1114a, when the driver applies a pedal force to the brake pedal 10 for braking operation, to provide a pedal feeling and at the same time, pressurize and discharge the pressurized medium accommodated therein.

FIG. 2 is an enlarged cross-sectional view of the first block 1100 of the electronic brake system 1000 according to the embodiment. Referring to FIG. 2, the integrated master cylinder 1110 may be divided into a pedal simulation unit that provides a pedal feeling to the driver, and a master cylinder unit that supplies and receives the pressurized medium to a main reservoir 1120 and the electrical unit to be described later. In the integrated master cylinder 1110, the pedal simulation unit and the master cylinder unit are sequentially provided from the brake pedal 10 side, and may be coaxially arranged within one cylinder block 1111.

In particular, the integrated master cylinder 1110 includes a cylinder block 1111 forming a chamber inside, a simulation chamber 1112a formed on an inlet side of the cylinder block 1111 to which the brake pedal 10 is connected, a simulation piston 1112 provided in the simulation chamber 1112a and connected to the brake pedal 10 so as to be displaceable according to the operation of the brake pedal 10, a first master chamber 1113a, a first master piston 1113 provided in the simulation chamber 1112a and provided to be displaceable by a displacement of the simulation piston 1112, a second master chamber 1114a, a second master piston 1114 provided in the second master chamber 1114a and provided to be displaceable by hydraulic pressure generated in the first master chamber 1113a according to a displacement of the first master piston 1113, an elastic member 1116 provided between the simulation piston 1112 and the first master piston 1113 and providing the pedal feeling through an elastic restoring force generated during compression, a simulator spring 1112b that elastically supports the simulation piston 1112, a first piston spring 1113b that elastically supports the first master piston 1113, and a second piston spring 1114b that elastically supports the second master piston 1114.

The simulation chamber 1112a, the first master chamber 1113a, and the second master chamber 1114a may be sequentially formed inward (left side with reference to FIGS. 1 and 2) from the brake pedal 10 side (right side with reference to FIGS. 1 and 2) on the cylinder block 1111 of the integrated master cylinder 1110. Furthermore, the simulation piston 1112, the first master piston 1113, and the second master piston 1114 are respectively disposed in the simulation chamber 1112a, the first master chamber 1113a, and the second master chamber 1114a to move forward and backward, so that the pressurized medium accommodated in each chamber may be pressurized or formed a negative pressure.

The simulation chamber 1112a may be formed on an inlet side or the outermost side (right side with reference to FIGS. 1 and 2) of the cylinder block 1111, and the simulation chamber 1112a is connected to an input rod of the brake pedal 10 the simulation piston 1112 may be reciprocally accommodated in the simulation chamber 1112a connected to an input rod of the brake pedal 10.

In the simulation chamber 1112a, the pressurized medium may be introduced and discharged through a first hydraulic port 1111a and a second hydraulic port 1111b. The first hydraulic port 1111a is connected to the first reservoir flow path 1131 to be described later to introduce the pressurized medium from the main reservoir 1120 to the simulation chamber 1112a. A first sealing member 1115a and a second sealing member 1115b are respectively provided on a front side (left side with reference to FIG. 2) and a rear side (right side with respect to FIGS. 1 and 2) of the first hydraulic port 1111a. Among the sealing members, the first sealing member 1115a allows only the supply of the pressurized medium from the first reservoir flow path 1131 to the simulation chamber 1112a and blocks a flow of the pressurized medium in the opposite direction, thereby preventing the pressurized medium of the simulation chamber 1112a from leaking into the first reservoir flow path 1131 through the first hydraulic port 1111a. The second hydraulic port 1111b is connected to a first connection line 1310 to be described later to allow the pressurized medium of the simulation chamber 1112a to discharge to the first connection line 1310, or conversely, introduce the pressurized medium from the first connection line 1310 into the chamber 1112a.

The simulation piston 1112 is provided to be accommodated in the simulation chamber 1112a, pressurizing the pressurized medium accommodated in the simulation chamber 1112a by moving forward (left direction with reference to FIGS. 1 and 2), or creating a negative pressure in the simulation chamber 1112a by moving backward.

The simulation piston 1112 may include a piston body 1112c in which a cut-off hole (not shown) communicating the first hydraulic port 1111a and the simulation chamber 1112a is formed, and a spring support 1112d that is formed to be expanded outwardly at end portion connected to the brake pedal 10. The piston body 1112c may pressurize the pressurized medium of the simulation chamber 1112a or generate a negative pressure by contacting an outer circumferential surface of the piston body 1112c with an inner circumferential surface of the simulation chamber 1112a. The spring support 1112d is disposed on an outside the cylinder block 1111 and has an expanded radius, and may be integrally formed with the piston body 1112c.

A simulator spring 1112b for elastically supporting the simulation piston 1112 is provided to be supported on the spring support 1112d. In particular, the simulator spring 1112b has one side supported on the cylinder block 1111 and the other side supported on one side of the spring support 1112d, and the input rod is supported on the other side of the spring support 1112d, so that the simulation piston 1112 may be operated in conjunction with the brake pedal 10. As the brake pedal 10 operates, a displacement of the simulation piston 1112 occurs. At this time, the simulator spring 1112b is compressed, and then, when the pedal force of the brake pedal 10 is released, the simulation piston 1112 may return to its original position while the simulator spring 1112b expands by the elastic force.

The first master chamber 1113a may be formed inside (left side with reference to FIGS. 1 and 2) of the simulation chamber 1112a on the cylinder block 1111, and the first master piston 1113a may be reciprocally accommodated in the first master chamber 1113a.

In the first master chamber 1113a, the pressurized medium may be introduced and discharged through a third hydraulic port 1111c and a fourth hydraulic port 1111d. The third hydraulic port 1111c is connected to a second reservoir flow path 1132 to be described later to introduce the pressurized medium from the reservoir 1120 to the first master chamber 1113a. A third sealing member 1115c and a fourth sealing member 1115d are respectively provided on a front side (left side with reference to FIGS. 1 and 2) and a rear side (right side with reference to FIGS. 1 and 2) of the third hydraulic port 1111c. Among the sealing members, the third sealing member 1115c allows only the supply of the pressurized medium from the second reservoir flow path 1132 to the first master chamber 1113a and blocks a flow of the pressurized medium in the opposite direction, thereby preventing the pressurized medium of the first master chamber 1113a from leaking into the second reservoir flow path 1132 through the third hydraulic port 1111c. The fourth hydraulic port 1111d is connected to a second connection line 1320 to be described later to allow the pressurized medium of the first master chamber 1113a to discharge to the second connection line 1320, or conversely, introduce the pressurized medium from the second connection line 1320 into the first master chamber 1113a.

The first master piston 1113 is provided to be accommodated in the first master chamber 1113a, pressurizing the pressurized medium accommodated in the first master chamber 1113a by moving forward, or creating a negative pressure in the first master chamber 1113a by moving backward. In particular, when the first master piston 1113 moves forward, as a volume of the first master chamber 1113a decreases, the pressurized medium present in the first master chamber 1113a may be pressurized to form a hydraulic pressure. On the contrary, as the volume of the first master chamber 1113a increases when the first master piston 1113 moves backward, the pressurized medium present in the first master chamber 1113a may be decompressed, and at the same time, a negative pressure may be formed in the first master chamber 1113a.

The second master chamber 1114a may be formed inside (left side with reference to FIGS. 1 and 2) of the first master chamber 1113a on the cylinder block 1111, and the second master piston 1114a may be reciprocally accommodated in the second master chamber 1114a.

In the second master chamber 1114a, the pressurized medium may be introduced and discharged through a fifth hydraulic port hue and a sixth hydraulic port uhf. The fifth hydraulic port hue is connected to the third reservoir flow path 1133 to be described later to introduce the pressurized medium from the reservoir 1120 to the second master chamber 1114a. A fifth sealing member 1115e and a sixth sealing member 1115f are respectively provided on a front side (left side with reference to FIGS. 1 and 2) and a rear side (right side with reference to FIGS. 1 and 2) of the fifth hydraulic port 11e. Among the sealing members, the fifth sealing member 1115e allows only the supply of the pressurized medium from the third reservoir flow path 1133 to the first master chamber 1113a and blocks a flow of the pressurized medium in the opposite direction, thereby preventing the pressurized medium of the second master chamber 1114a from leaking into the third reservoir flow path 1133 through the fifth hydraulic port 11e. The sixth hydraulic port 1111f is connected to a circulation line 1140 to be described later to allow the pressurized medium of the second master chamber 1114a to discharge the circulation line 1140, or conversely, introduce the pressurized medium from the circulation line 1140 into the second master chamber 1114a.

The second master piston 1114 is provided to be accommodated in the second master chamber 1114a, pressurizing the pressurized medium accommodated in the second master chamber 1114a by moving forward, or creating a negative pressure in the second master chamber 1114a by moving backward. In particular, when the second master piston 1114 moves forward, as a volume of the second master chamber 1114a decreases, the pressurized medium present in the second master chamber 1114a may be pressurized to form a hydraulic pressure. On the contrary, when the second master piston 1114 moves backward, as the volume of the second master chamber 1114a increases, the pressure medium present in the second master chamber 1114a may be decompressed, and at the same time, a negative pressure may be formed in the second master chamber 1114a.

On the other hand, the integrated master cylinder 1110 according to the embodiment may utilize the simulation chamber 1112a, the first master chamber 1113a, and the second master chamber 1114a to ensure a safety in the case of failure of component. For example, the simulation chamber 1112a and the second master chamber 1114a may be connected to a first hydraulic circuit 1240 including any two wheels of a right front wheel FR, a left front wheel FL, a left rear wheel RL and a right rear wheel RR through the first connection line 1310 described to be later, and the first master chamber 1113a may be connected to the other two wheels through the second connection line 1320. Accordingly, even when a problem such as a leak occurs in any one of the chambers, braking the vehicle may be possible.

The first piston spring 1113b and the second piston spring 1114b are provided to elastically support the first master piston 1113 and the second master piston 1114, respectively. To this end, the first piston spring 1113b may be disposed between a front surface (left end with reference to FIGS. 1 and 2) of the first master piston 1113 and a rear surface (right end with reference to FIGS. 1 and 2) of the second master piston 1114, and the second piston spring 1114b may be disposed between a front surface (left end with reference to FIGS. 1 and 2) of the second master piston 1114 and an inner surface of the cylinder block 1211. When a displacement occurs in the first master piston 1113 and the second master piston 1114 according to an operation such as braking etc., the first piston spring 1113b and the second piston spring 1114b are compressed, respectively. Thereafter, when the operation such as the braking etc., the first piston spring 1113b and the second piston spring 1114b expand by an elastic force and the first master piston 1113 and the second master piston 1114 may return to their original positions, respectively.

The elastic member 1116 is disposed between the simulation piston 1112 and the first master piston 1113, and is provided to provide a pedal feeling of the brake pedal 10 to the driver by its own elastic restoring force. The elastic member 1116 may be made of a material such as compressible and expandable rubber, and when a displacement occurs in the simulation piston 1112 by the operation of the brake pedal 10, the elastic member 1116 is compressed, and the driver may receive a stable and familiar pedal feel by an elastic restoring force of the elastic member 1116.

The reservoir flow path may be provided to hydraulically connect the main reservoir 1120 and the integrated master cylinder 1110. The reservoir flow path may include the first reservoir flow path 1131 connecting the simulation chamber 1112a and the main reservoir 1120, the second reservoir flow path 1132 connecting the first master chamber 1113a and the main reservoir 1120, and the third reservoir flow path 1133 connecting the second master chamber 1114a and the main reservoir 1120.

Explaining a pedal simulation operation by the integrated master cylinder 1110, in a normal operation, the driver operates the brake pedal 10 and at the same time, a first cut valve 1311 and a second cut valve 1321 of the electrical unit to be described later are each closed, and a simulator valve 1351 is opened. As the operation of the brake pedal 10 proceeds, the simulation piston 1112 moves forward, but the first master chamber 1113a is closed by a closing operation of the second cut valve 1321, and the second master chamber 1114a is synchronized with the simulation chamber 1112a by the circulation line 1140, so that the first master piston 1113 and the second master piston 1114 do not have a displacement sufficient to generate a hydraulic pressure in the first master chamber 1113a and the second master chamber 1114a. Accordingly, the displacement of the simulation piston 1112 compresses the elastic member 1116, and the elastic restoring force by compression of the elastic member 1116 may be provided to the driver as a pedal feel. At this time, the pressurized medium accommodated in the simulation chamber 1112a is transmitted to the main reservoir 1120 through the first connection line 1310 described later, a simulation flow path 1350, and the third connection line 1330. Thereafter, when the driver releases the pedal effort of the brake pedal 10, as the simulator spring 1112b and the elastic member 1116 extend by the elastic forces, the simulation piston 1112 returns to its original position, so that the simulation chamber 1112a may be refilled with the pressurized medium.

As such, because the inside of the simulation chamber 1112a, the first master chamber 1113a, and the second master chamber 1114a is always filled with the pressurized medium, when the pedal simulation is operated, the friction between the simulation piston 1112 and the cylinder block 1211 is minimized, thereby improving the durability of the integrated master cylinder 1110 and preventing the inflow of foreign substances from the outside.

The electrical unit may include a component that is electronically operated and controlled by a control signal of the ECU (not shown).

The electrical unit includes the ECU, a hydraulic pressure supply device 1210 that generates hydraulic pressure by operating a hydraulic piston 1212 by an electrical signal output in response to the displacement of the brake pedal 10, a hydraulic control unit 1220 including a plurality of valves to transmit a hydraulic pressure of the pressurized medium supplied from the hydraulic pressure supply device 1210 to wheel cylinders 20 and to control the hydraulic pressure at the same time, a dump control unit 1230 provided between the hydraulic pressure supply device 1210 and the main reservoir 1120 to control a flow of the pressurized medium, and the simulator valve 1351 that controls the operation of the simulation unit described above.

The hydraulic pressure supply device 1210 realizes reciprocating movement of the hydraulic piston 1212 by receiving the driver's braking intention as an electrical signal from a pedal displacement sensor that detects the displacement of the brake pedal 10, and through this, the hydraulic pressure of the pressurized medium is generated.

The hydraulic pressure supply device 1210 may a hydraulic pressure supply unit that provides a pressure of the pressurized medium delivered to the wheel cylinders 20, and a power supply unit (not shown) that generates power of the hydraulic piston 1212 based on an electrical signal of the pedal displacement sensor.

The hydraulic pressure supply unit includes the cylinder block 1211 in which the pressurized medium is accommodated, the hydraulic piston 1212 accommodated in the cylinder block 1211, and a sealing member provided between the hydraulic piston 1212 and the cylinder block 1211 to seal pressure chambers.

The pressure chambers 1213 and 1214 may include a first pressure chamber 1213 positioned a front side (left direction of the hydraulic piston 1212 with reference to FIG. 1) of the hydraulic piston 1212, and a second pressure chamber 1214 positioned in a rear side (right direction of the hydraulic piston 1212 with reference to FIG. 1) of the hydraulic piston 1212. In other words, the first pressure chamber 1213 is partitioned by the cylinder block 1211 and a front surface of the hydraulic piston 1212 and is provided so that the volume varies according to a movement of the hydraulic piston 1212, and the second pressure chamber 1214 is partitioned by the cylinder block 1211 and a rear surface of the hydraulic piston 1212 and is provided so that the volume varies according to the movement of the hydraulic piston 1212.

The first pressure chamber 1213 may be hydraulically connected to the hydraulic control unit 1220 to be described later by a hydraulic flow path, and the second pressure chamber 1214 may also be hydraulically connected to the hydraulic control unit 1220 by a hydraulic flow path.

The sealing member may include a piston sealing member provided between the hydraulic piston 1212 and the cylinder block 1211 to seal between the first pressure chamber 1213 and the second pressure chamber 1214, and a drive shaft sealing member provided between the power supply unit and the cylinder block 1211 to seal openings of the second pressure chamber 1214 and the cylinder block 1211. The hydraulic pressure or negative pressure of the first pressure chamber 1213 and the second pressure chamber 1214 generated by forward or backward movements of the hydraulic piston 1212 may be sealed by the piston sealing member 115 and the drive shaft sealing member to transmitted to the hydraulic flow paths without a leakage.

The power supply unit may generate and provide a power to the hydraulic piston 1212 by an electrical signal. For example, the power supply unit may include a motor for generating a rotational force, and a power converter that converts the rotational force of the motor into a translational movement of the hydraulic piston 1212, but is not limited to the corresponding structure and device.

The dump control unit 1230 may include a plurality of flow paths and various solenoid valves provided between the third connection line 1330 and the hydraulic pressure supply device 1210, and the corresponding valves are electrically operated and controlled by the ECU.

The first pressure chamber 1213 and the second pressure chamber 1214 may be connected to the main reservoir 1120 by the dump control unit 1230. The first pressure chamber 1213 and the second pressure chamber 1214 through the dump control unit 1230 may receive the pressurized medium from the main reservoir 1120 through the third connection line 1330 to be described later, or conversely, transmit the pressurized medium accommodated in the first pressure chamber 1213 and the second pressure chamber 1214 to the main reservoir 1120 through the third connection line 1330.

The hydraulic control unit 1220 may be provided between the hydraulic pressure supply device 1210 and the wheel cylinders 20 and the operation thereof is controlled by the electronic control unit to adjust the hydraulic pressure transmitted to the wheel cylinders 20.

The hydraulic control unit 1220 may include a first hydraulic circuit 1240 for controlling the flow of hydraulic pressure transmitted to first and second wheel cylinders 21 and 22 among the four wheel cylinders 20, and a second hydraulic circuit 1250 for controlling the flow of the hydraulic pressure transmitted to third and fourth wheel cylinders 23 and 24, and include a plurality of flow paths and solenoid valves to control the hydraulic pressure transmitted from the integrated master cylinder 1110 and the hydraulic pressure supply device 1210 to the wheel cylinders 20.

The first and second hydraulic circuits 1240 and 1250 may include first to fourth inlet valves 1241a, 1241b, 1251a, and 1251b for controlling the flow of the pressurized medium toward the first to fourth wheel cylinders 20, respectively. The first to fourth inlet valves 1241a, 1241b, 1251a, and 1251b are respectively disposed on an upstream side of the first to fourth wheel cylinders 20, and may be provided as a normally open type solenoid valves that is normally open and operates to be closed the valve when an electrical signal is received from the ECU.

The first and second hydraulic circuits 1240 and 1250 may include first to fourth check valves 1243a, 1243b, 1253a, and 1253b provided to be connected in parallel to the first to fourth inlet valves 1241a, 1241b, 1251a, and 1251b. The check valves 1243a, 1243b, 1253a, and 1253b may be provided in bypass flow paths to connect front and rear sides of the first to fourth inlet valves 1241a, 1241b, 1251a, and 1251b on the first and second hydraulic circuits 1240 and 1250, and may allow only the flow of the pressurized medium from each wheel cylinder 20 to the hydraulic pressure supply device 1210 and block the flow of the pressurized medium from the hydraulic pressure supply unit 1210 to the wheel cylinders 20. The first to fourth check valves 1243a, 1243b, 1253a, and 1253b may quickly release the hydraulic pressure of the pressurized medium applied to each wheel cylinder 20, and when the first to fourth inlet valves 1241a, 1241b, 1251a, and 1251b do not operate normally, the hydraulic pressure of the pressurized medium applied to the wheel cylinder 20 may be smoothly returned to the hydraulic pressure supplying device 1210 side.

The first hydraulic circuit 1240 may include at least one first cut valve 1311 provided in the first connection line 1310 to be described later to improve performance when braking of the first and second wheel cylinders 21 and 22 is released. The first cut valves 1311 may be respectively provided by a couple on a downstream side of the first and second wheel cylinders 21 and 22, or may be provided at a rear end of the point at which the downstream of the first and second wheel cylinders 21 and 22 join and are connected to the first connection line 1310. The first cut valve 1311 may implement braking by transmitting the pressurized medium supplied from the integrated master cylinder 1110 to the first and second wheel cylinders 21 and 22 while maintaining an open state in an emergency, such as a fallback mode, or control depressurization of the wheel cylinders 21 and 22 by being selectively opened when decompression braking such as an anti-lock braking system (ABS) dump mode is required by detecting braking pressure of the first and second wheel cylinders 21 and 22. The first cut valve 1311 may be provided as a normally open type solenoid valve that is normally open and operates to be closed the valve when an electric signal is received from the ECU.

The second hydraulic circuit 1250 may include first and second outlet valves 1252a and 1252b for controlling the hydraulic pressure of the pressurized medium discharged to a first sub-line 1332 to be described later so as to improve performance when the third and fourth wheel cylinders 23 and 24 are released from braking. The first and second outlet valves 1252a and 1252b may control depressurization of the wheel cylinders 23 and 24 by being selectively opened when decompression braking such as the ABS dump mode is required by detecting the braking pressure of the third and fourth wheel cylinders 23 and 24. The first and second outlet valves 1252a and 1252b may be provided as a normally closed type solenoid valve that is normally closed and operates to open the valve when an electrical signal is received from the ECU.

The simulator valve 1351 is electronically operated and controlled by the ECU and is disposed in the second block 1200. A detailed description of the simulator valve 1351 will be described together with the simulation flow path 1350 below.

On the other hand, the electrical unit further includes a plurality of pressure sensors arranged in a variety of flow paths to detect a hydraulic pressure of the pressurized medium. In FIG. 1, the pressure sensor is illustrated as being arranged on each of the first hydraulic circuit 1240, the second hydraulic circuit 1250, and the second connection line 1320 to be described later, but it is not limited to the corresponding positions and may include a case where it is provided in various positions of the electrical unit to detect the hydraulic pressure of the pressurized medium.

The connection lines 1300 are provided to hydraulically connect the first block 1100 of the mechanical unit and the second block 1200 of the electrical unit, which are arranged to be spaced apart from each other.

The connection lines 1300 may include the first connection line 1310 connecting the simulation chamber 1112a of the integrated master cylinder 1110 to the first hydraulic circuit 1240 side, the second connection line 1320 connecting the first master chamber 1113a to the second hydraulic circuit 1250 side, and the third connection line 1330 connecting the main reservoir 1120 to the hydraulic pressure supply device 1210 and the second hydraulic circuit 1250, respectively.

The first connection line 1310 may be provided with one end communicating with the simulation chamber 1112a and the other end thereof branching to the downstream side of the first and second wheel cylinders 21 and 22 of the first hydraulic circuit 1240. At least one first cut valve 1311 may be provided on the downstream side of the first and second wheel cylinders 21 and 22 on the first connection line 1310 and control the flow of the pressurized medium between the simulation chamber 1112a and the first and second wheel cylinders 21 and 22.

The simulation flow path 1350 may be branched and provided at a front end of the point where the first cut valve 1311 is provided on the first connection line 1310, and the simulation flow path 1350 may have one end branched to the first connection line 1310 and the other end thereof joined the first sub-line 1332 to be described later. The simulation flow path 1350 may be provided with that simulator valve 1351 that controls the flow of the pressurized medium delivered through the simulation flow path 1350 in both directions. The simulator valve 1351 may be provided as a normally closed type solenoid valve that is normally closed and operates to open the valve when an electrical signal is received from the ECU.

The bypass flow path 1352 may be provided in the simulation flow path 1350 arranged in parallel with the simulator valve 1351. To this end, opposite ends of the bypass flow path 1352 may be respectively connected to front and rear sides of the simulator valve 1351, and the simulator check valve 1352 that allows only the flow of the pressurized medium from the first sub-line 1332 toward the simulation chamber 1112*a* may be provided on the bypass flow path 1352.

In a normal operation of the electronic brake system 1000, as the simulator valve 1351 is opened by the ECU, the pressurized medium accommodated in the simulation chamber 1112*a* may be transmitted to the main reservoir 1120 by sequentially passing through the first connection line 1310, the simulation flow path 1350, the first sub-line 1332, and a main line 1331. Accordingly, an elastic member 1116 is compressed by the forward movement of the simulation piston 1112, and the elastic restoring force by the compression of the elastic member 1116 is provided to the driver as a pedal feeling, as described above.

On the other hand, the second master chamber 1114*a* may be joined to the first connection line 1310 by a circulation line 1140, and the circulation line 1140 may be provided with an orifice for suppressing reduction of pulsation due to the change in the hydraulic pressure of the pressurized medium.

The second connection line 1320 may have one end connected to the first master chamber 1113*a* and the other end thereof connected to the second hydraulic circuit 1250 side. In FIG. 1, the other end of the second connection line 1320 is illustrated as being connected to the fourth wheel cylinder 24, but includes a case in which the third and fourth wheel cylinders 23 and 24 are branched to the downstream side. The second cut valve 1321 for controlling the flow of the pressurized medium in both directions may be provided in the second connection line 1320. The second cut valve 1321 may be provided as a normally open type solenoid valve that is normally open and operates to be closed the valve when a closing signal is received from the ECU.

As such, when the first and second cut valves 1311 and 1321 are closed, the pressure medium of the integrated master cylinder 1110 is prevented from being directly transmitted to the wheel cylinder 20, and at the same time, the hydraulic pressure supplied from the hydraulic pressure supply device 1210 may be supplied to the wheel cylinders 20 through the hydraulic control unit 1220, and when the first and second cut valves 1321 are opened, the pressurized medium pressurized in the integrated master cylinder 1110 may be directly supplied to the wheel cylinders 20 through the second connection line 1320, thereby implementing braking.

The third connection line 1330 may include the main line 1331 communicating with the main reservoir 1120, the first sub-line 1332 that is branched from the main line 1331 and connected to the second hydraulic circuit 1250, and a second sub-line 1333 that is branched from the main line 1331 and connected to the hydraulic pressure supply device 1210 or the dump control unit 1230.

The main line 1331 is in communication with the main reservoir 1120 and is connected to the first and second sub-lines 1332 and 1333, and may hydraulically connect the main reservoir 1120 and the second hydraulic circuit 1250, and the main reservoir 1120 and the hydraulic pressure supply device 1210 (or the dump control unit 1230). As described above, the simulation flow path 1350 is branched from the first connection line 1310 and may join and be connected to the first sub-line 1332. Accordingly, the pressurized medium discharged from the simulation chamber 1112*a* and delivered to the simulation flow path 1350 may be supplied to the main reservoir 1120 through the first sub-line 1332 and the main line 1331. The second sub-line 1333 is branched due to the hydraulic pressure supply device 1210 having the first pressure chamber 1213 and the second pressure chamber 1214, and may be directly connected to the hydraulic pressure supply device 1210, or connected to the hydraulic pressure supply device 1210 via the dump control unit 1230.

The first connection line 1310 and the second connection line 1320 may be provided as a pipe having a predetermined strength, and the third connection line 1330 may be provided as a hose having elasticity. The first connection line 1310 and the second connection line 1320 transmit the pressure medium on which the hydraulic pressure is formed from the simulation chamber 1112*a* and the first master chamber 1113*a*, respectively, so the first connection line 1310 and the second connection line 1320 may be provide with a pipe having strength to withstand the hydraulic pressure, thereby promoting durability and performance of the product. On the other hand, the third connection line 1330 is provided in connection with the main reservoir 1120 having an internal pressure of the atmospheric pressure level, and thus the pressurized medium in which the hydraulic pressure is not formed is transmitted. Accordingly, the third connection line 1330 may be provided with a material having an elasticity that may be flexibly installed in response to installation position of the first block 1100 and the second block 1200.

Hereinafter, a modified example of an electronic brake system according to an embodiment of the disclosure will be described.

The description of an electronic brake system 1001 according to the modified embodiment of the disclosure to be described below is the same as the description of the electronic brake system 1000 according to the embodiment of the disclosure described above except for cases where separate reference numerals are used to further describe the disclosure, and thus the description will be omitted to prevent duplication of content.

An electrical unit of the electronic brake system 1001 according to the modified embodiment of the disclosure may further include a sub-reservoir 1280 provided in the third connection line 1330 and arranged in the second block 1200.

The sub-reservoir 1280 may be provided at a point where the first sub-line 1332 and the second sub-line 1333 are branched from the main line 1331 of the third connection line 1330 to auxiliary store the pressurized medium. Because the sub-reservoir 1280 stores the pressurized medium auxiliary in the electrical unit, the pressurized medium may be smoothly supplied and received within the electrical unit for example, the hydraulic pressure supply device 1210, the dump control unit 1230, the first and second hydraulic circuits 1240 and 1250, and the like.

As described above, the electronic brake systems 1000 and 1001 according to the embodiment of the disclosure may be mounted to the vehicle in a state where the first block 1100 in which the mechanically operated mechanical unit is disposed and the second block 1200 in which the electronically operated and controlled electrical unit is disposed are physically separated from each other, so that the mountability of the vehicle is improved and the degree of design freedom of the vehicle is freed. Furthermore, the same electronic brake system 1000 and 1001 is applied regardless of whether the vehicle is a left-hand drive (LHD)/a right-hand drive (RHD), so that vehicle development can be facilitated and productivity of the product can be improved. Furthermore, the first block 1100 of the mechanical unit interworked with the brake pedal 10 is installed close to a passenger seat of the vehicle and the second block 1200 of the electrical unit that forms and adjusts hydraulic pressure while electronically operated and controlled is installed in a position spaced apart from the passenger seat of the vehicle, it is possible not only to suppress the noise generated in the process of generating and adjusting the hydraulic pressure of the pressurized medium from entering the passenger seat, but also to promote product competitiveness by reducing the cost for maintenance when any one of the first block 1100 and the second block 1200 fails.

The invention claimed is:

1. An electronic brake system, comprising:
a first block in which a mechanical unit operated mechanically in association with a brake pedal is disposed;
a second block in which an electrical unit electronically operated and controlled by an electronic control unit (ECU) is disposed; and
a connection line configured to hydraulically connect the first block and the second block; wherein
the mechanical unit comprises:
a main reservoir in which a pressurized medium is stored; and
an integrated master cylinder comprising a simulation piston connected to the brake pedal, a simulation chamber whose volume is changed by a displacement of the simulation piston, a master piston connected to the simulation piston, a master chamber whose volume is changed by a displacement of the master piston, and an elastic member provided between the simulation piston and the master piston;
the electrical unit comprises:
a hydraulic pressure supply device configured to generate a hydraulic pressure by operating a hydraulic piston by an electric signal output in response to a displacement of the brake pedal;
a hydraulic control unit including a first hydraulic circuit having two wheel cylinders, a second hydraulic circuit having the other two wheel cylinders, and a plurality of flow paths and valves configured to control a hydraulic pressure transmitted to the first hydraulic circuit and the second hydraulic circuit; and
the ECU;
the connection line comprises:
a first connection line connecting the simulation chamber to the first hydraulic circuit;
a second connection line connecting the master chamber to the second hydraulic circuit; and
a third connection line connecting the main reservoir to the hydraulic pressure supply device and the second hydraulic circuit, respectively,
wherein
the master piston comprises a first master piston and a second master piston,
the master chamber comprises a first master chamber whose volume is changed by a displacement of the first master piston and a second master chamber whose volume is changed by a displacement of the second master piston,
the first master piston is connected to the simulation piston through the elastic member, and
the second master piston is provided between the first master chamber and the second master chamber to be displaceable by a hydraulic pressure of the first master chamber.

2. The electronic brake system of claim 1, wherein
the mechanical unit further comprises a reservoir flow path connecting the main reservoir and the integrated master cylinder, and
the reservoir flow path comprises a first reservoir flow path connecting the reservoir and the simulation chamber, a second reservoir flow path connecting the reservoir and the first master chamber, and a third reservoir flow path connecting the reservoir and the second master chamber.

3. The electronic brake system of claim 1, wherein
the second connection line connects the first master chamber to the second hydraulic circuit side, and
the mechanical unit further comprises a circulation line connecting the second master chamber and the first connection line, and an orifice provided in the circulation line.

4. The electronic brake system of claim 1, wherein
the integrated master cylinder further comprises a simulator spring elastically supporting the simulation piston, a first piston spring interposed between the first master piston and the second master piston, and a second piston spring interposed between a cylinder block and the second master piston.

5. An electronic brake system, comprising:
a first block in which a mechanical unit operated mechanically in association with a brake pedal is disposed;
a second block in which an electrical unit electronically operated and controlled by an electronic control unit (ECU) is disposed; and
a connection line configured to hydraulically connect the first block and the second block; wherein
the mechanical unit comprises:
a main reservoir in which a pressurized medium is stored; and
an integrated master cylinder comprising a simulation piston connected to the brake pedal, a simulation chamber whose volume is changed by a displacement of the simulation piston, a master piston connected to the simulation piston, a master chamber whose volume is changed by a displacement of the master piston, and an elastic member provided between the simulation piston and the master piston;
the electrical unit comprises:
a hydraulic pressure supply device configured to generate a hydraulic pressure by operating a hydraulic piston by an electric signal output in response to a displacement of the brake pedal;
a hydraulic control unit including a first hydraulic circuit having two wheel cylinders, a second hydraulic circuit having the other two wheel cylinders, and a plurality of flow paths and valves configured to control a hydraulic pressure transmitted to the first hydraulic circuit and the second hydraulic circuit; and
the ECU;
the connection line comprises:
a first connection line connecting the simulation chamber to the first hydraulic circuit;
a second connection line connecting the master chamber to the second hydraulic circuit; and
a third connection line connecting the main reservoir to the hydraulic pressure supply device and the second hydraulic circuit, respectively, wherein the third connection line comprises a main line communicating with the main reservoir, a first sub-line branched from the main line and connected to the second hydraulic circuit, and a second sub-line branched from the main line and connected to the hydraulic pressure supply device.

6. The electronic brake system of claim 5, wherein
the electrical unit further comprises a sub-reservoir provided at a point where the first and second sub-lines are branch from the main line to auxiliary store the pressurized medium.

7. The electronic brake system of claim 5, wherein
the electrical unit further comprises a simulation flow path branched from the first connection line and connected to the first sub-line, and a simulator valve provided in the simulation flow path.

8. The electronic brake system of claim 7, wherein
the electrical unit further comprises at least one first cut valve provided in the first connection line to control a flow of the pressurized medium, and a second cut valve provided in the second connection line to control a flow of the pressurized medium.

9. The electronic brake system of claim 8, wherein
the first hydraulic circuit comprises first and second inlet valves configured to control a flow of the pressurized medium supplied from the hydraulic pressure supply device to first and second wheel cylinders, respectively, and the pressurized medium discharged from the first and second wheel cylinders is supplied to the first connection line and is controlled by the first cut valve, and
the second hydraulic circuit comprises third and fourth inlet valves configured to control a flow of the pressurized medium supplied from the hydraulic pressure supply device to third and fourth wheel cylinders, respectively, and first and second outlet valves configured to control the pressurized medium that is discharged from the third and fourth wheel cylinders and supplied to the first sub-line.

10. The electronic brake system of claim 7, wherein
the electrical unit further comprises a bypass flow path connected in parallel to the simulator valve on the simulation flow path, and a simulator check valve provided in the bypass flow path to allow only a flow of the pressurized medium from the first sub-line toward the first connection line.

11. The electronic brake system of claim 5, wherein
the electrical unit further comprises a dump control unit provided between the hydraulic pressure supply device and the second sub-line to control a flow of the pressurized medium.

12. The electronic brake system of claim 11, wherein
the hydraulic supply device comprises a first pressure chamber positioned in a front side of the hydraulic piston, and a second pressure chamber positioned in a rear side of the hydraulic piston.

13. The electronic brake system of claim 12, wherein
the second sub-line is provided to be branched toward the first pressure chamber and the second pressure chamber.

14. An electronic brake system, comprising:
a first block in which a mechanical unit operated mechanically in association with a brake pedal is disposed;
a second block in which an electrical unit electronically operated and controlled by an electronic control unit (ECU) is disposed; and
a connection line configured to hydraulically connect the first block and the second block; wherein
the mechanical unit comprises:
a main reservoir in which a pressurized medium is stored; and
an integrated master cylinder comprising a simulation piston connected to the brake pedal, a simulation chamber whose volume is changed by a displacement of the simulation piston, a master piston connected to the simulation piston, a master chamber whose volume is changed by a displacement of the master piston, and an elastic member provided between the simulation piston and the master piston;
the electrical unit comprises:
a hydraulic pressure supply device configured to generate a hydraulic pressure by operating a hydraulic piston by an electric signal output in response to a displacement of the brake pedal;
a hydraulic control unit including a first hydraulic circuit having two wheel cylinders, a second hydraulic circuit having the other two wheel cylinders, and a plurality of flow paths and valves configured to control a hydraulic pressure transmitted to the first hydraulic circuit and the second hydraulic circuit; and
the ECU;
the connection line comprises:
a first connection line connecting the simulation chamber to the first hydraulic circuit;
a second connection line connecting the master chamber to the second hydraulic circuit; and
a third connection line connecting the main reservoir to the hydraulic pressure supply device and the second hydraulic circuit, respectively,
wherein
the first connection line and the second connection line are provided with a pipe having rigidity, and
the third connection line is provided with a hose having elasticity.

* * * * *